United States Patent
Jin et al.

(10) Patent No.: US 6,891,455 B2
(45) Date of Patent: May 10, 2005

(54) APPARATUS FOR CONTROL OF UNIFORM GRAVITY UTILIZING SUPERCONDUCTING MAGNET

(75) Inventors: Hong-Beom Jin, Soowon-si (KR); Ki-Deok Sim, Anyang-si (KR); Byeung-Sang Park, Seoul (KR); Hyung-Jin Kim, Seoul (KR); Ho-Hwan Han, Seoul (KR); Kyung-Han Kim, Seoul (KR); Suk-Jin Choi, Seoul (KR)

(73) Assignee: Duksung Co., Ltd., Kyungki-Do (KR)

( * ) Notice: Subject to any disclaimer, the term of this patent is extended or adjusted under 35 U.S.C. 154(b) by 0 days.

(21) Appl. No.: 10/485,061

(22) PCT Filed: Sep. 17, 2001

(86) PCT No.: PCT/KR01/01553

§ 371 (c)(1),
(2), (4) Date: May 20, 2004

(87) PCT Pub. No.: WO03/012804

PCT Pub. Date: Feb. 13, 2003

(65) Prior Publication Data

US 2005/0040921 A1 Feb. 24, 2005

(30) Foreign Application Priority Data

Aug. 1, 2001 (KR) ..................................... 2001/0046615

(51) Int. Cl.[7] .............................. H01F 5/00; H01F 6/00
(52) U.S. Cl. ...................................... 335/216; 335/299
(58) Field of Search ........................ 335/216, 296–306; 324/318–320

(56) References Cited

U.S. PATENT DOCUMENTS 6,362,712 B1 * 3/2002 Kiyoshi et al. ............. 335/299

FOREIGN PATENT DOCUMENTS

| JP | 02-290800 | 11/1990 |
| JP | 03-080510 | 4/1991 |
| JP | 03-122590 | 5/1991 |

* cited by examiner

*Primary Examiner*—Ramon M. Barrera
(74) *Attorney, Agent, or Firm*—Connolly Bove Lodge & Hutz LLP; Myron K. Wyche

(57) ABSTRACT

A gravity control apparatus is provided, in which is controlled through the superconducting coil designed for generating uniform magnetic force. The gravity control apparatus includes a hollow cylindrical low temperature container; a combination of B0 coil and a symmetric and/or asymmetric gradient magnetic field generating coil having a predetermined length and inner and outer radiuses, wherein each of B0 coil and gradient magnetic field generating coil is wound onto a bobbin which is installed to the low temperature container so as to form a superconducting magnet, and the B0 coil has three solenoid coils which are arrayed in three parts with a predetermined spacing so as to generate, from the center of the B0 coil, uniform magnetic field having constant magnetic flux density; and a power unit for supplying operating current to each of coils. Thus, gravity acting on the material disposed in the hollow center of the low temperature container can be compensated with a uniform magnetic force.

6 Claims, 14 Drawing Sheets

BACKGROUND ART

BACKGROUND ART

BACKGROUND ART

APPARATUS FOR CONTROL OF UNIFORM GRAVITY UTILIZING SUPERCONDUCTING MAGNET

FIELD OF THE INVENTION

The present invention relates to an apparatus for control of uniform gravity acting on substances utilizing a superconducting magnet which generates uniform magnetic force, and more particularly, to a gravity control apparatus in which uniform magnetic force is generated by adopting a superconducting magnet design for generating spatially uniform magnetic force and correcting method for offset of magnetic force non-uniformity caused due to manufacturing errors of the magnet, and the gravity acting on substances can be controlled to be uniform through the use of thus-generated uniform magnetic force.

BACKGROUND OF THE INVENTION

Since a spacecraft like a space shuttle circling around the earth in the space has an interior thereof with balanced gravity and centrifugal force, a micro gravity environment which is nearly a gravity free environment is arranged. Under such a micro gravity environment, convection may not occur and sedimentation caused due to density difference can be avoided. Further, since such a micro gravity environment eliminates the necessity of using a container, optimum single crystal growth having no lattice defect has been expected. According to "Science, vol.270. p.1921–1922, 1995 entitled *Search for Better Crystals Explores Inner, Outer Space*", European researchers have tried crystal growth of protein by utilizing space shuttle of United States, and they have succeeded in achieving optimum protein crystal growth which is almost impossible in the earth.

However, such a trial using the micro gravity environment in the space costs high and suffers drawbacks in terms of time and space. An approach of using a magnetic force has been proposed to overcome such drawbacks.

It is common knowledge that a magnet attracts materials like iron. Since ferromagnetic material like iron has a high magnetic susceptibility, it may be influenced by even a weak magnetic field. In addition, since the magnetic susceptibility has positive sign, the ferromagnetic material is attracted by a common permanent magnet.

Materials but the ferromagnetic material are classified into paramagnetic material and diamagnetic material. Such materials are free from the influence of common magnet, since they have extremely low magnetic susceptibility. However, paramagnetic and diamagnetic materials are influenced by a superconducting magnet which generates strong magnetic field. Paramagnetic material is attracted by the magnetic because it has a magnetic susceptibility with positive sign, while diamagnetic material is repulsive against the magnet because it has a magnetic susceptibility with negative sign.

For convenience of explanation on the virtual micro gravity environment where magnetic force is utilized, a basic formula of the gravity and magnetic force which can be found in a gravitational field and magnetic field will be given. Each formula has physical quantity expressed in SI unit. All materials on the earth are under influence of gravity which acts downwardly on the material. The gravity per unit volume acting on the object with the density of p [kg/m³] can be expressed as follows.

[Formula 1]

$$F_G = \rho \cdot g [N/m^3] \quad (1)$$

Wherein, g is acceleration of gravity and has a value of approximately 9.8 [m/s²] with a little difference according to the position on the earth. According to "Mcgraw-Hill Encyclopedia of Science and Technology, vol.10, Mcgraw-Hill, New York, p.314–316, 1992", magnetic force per unit volume acting on the magnetic material positioned in the magnetic field can be expressed as follows.

[Formula 2]

$$F_M = \frac{1}{2}\frac{\chi}{\mu^2}\nabla B^2 [N/m^3] \quad (2)$$

Wherein, $\chi$ is volumetric magnetic susceptibility of magnetic material, $\mu$ is permanently, and B [T] is magnetic flux density. The magnetic force in case of gradient magnetic field where the magnetic flux density B changes only in z-axis direction, can be expressed as follows.

[Formula 3]

$$F_M = \frac{\chi}{\mu^2} B_z (dB_z/dz) [N/m^3] \quad (3)$$

Therefore, in case where the magnetic force $F_M$ of Formula 3 has a size same as that of the gravitating force of Formula 1 and the magnetic force $F_M$ acts upwardly, the magnetic material disposed in the magnetic field is in a substantially gravity free environment. The gravity acting on the material can be controlled by utilizing the magnetic force $F_M$ since the magnetic force $F_M$ acts similarly with the centrifugal force.

FIG. 1 is a schematic perspective view and FIG. 2 is a sectional view illustrating a conventional apparatus for control of gravity acting on materials through the use of a superconducting magnet. A gravity control apparatus 10 include a hollow cylindrical low temperature container 11 with a hollow cylindrical bobbin 13 mounted thereto, wherein the bobbin is wound with a coil. When the coil is applied with electric power, a material 20 positioned in a hollow portion 15 of the low temperature container 11 is under gravity free or low gravity condition. The low temperature container 11 is generally made up of an aluminum or stainless steel, and the bobbin 13 is made up of FRP or aluminum. When the coil is applied with electric power and the magnetic force $F_M$ acts upwardly, the material 20 disposed in the magnetic field is under the micro gravity environment where $F=F_G-F_M$. When the coil is applied with electric power and the magnetic force $F_M$ acts downwardly, the material 20 disposed in the magnetic field is under over gravity environment where $F=F_G+F_M$.

Japanese researchers have reported that they have made success in flotation of material by utilizing magnetic force, and crystal growth of protein and marking of new material by utilizing virtual micro gravity space formed by magnetic force. For instance, according to "Symposium on New Magnetic Science '97-Japan, p.181–188", they have made success in flotation of water, NaCl, Bi and the like by using a superconducting magnet, and synthesizing of new material. According to "Journal of Crystal Growth, vol. 178, p.653–656, 1997 entitled *Effect of a magnetic field gradient on the crystallization of hen lysozyme*", gravity controlled by magnetic force may exert influence on the crystal growth of protein. However, the magnet employed for the above-mentioned study is disadvantageous in that the magnetic force which is marked in solid line in FIG. 3 is produced from both ends of the magnet having gradient magnetic field which is marked in a dotted line, and thus-produced magnetic force has non-uniformity in spatial distribution. Therefore, it is impossible to form a spatially uniform micro gravity space. A need therefore continues to exist for a magnet which generates spatially uniform magnetic force so as to uniformly control the gravity acting on material. When such a magnet is developed, an activity in the new field of study where a virtual micro gravity environment is adopted will be increased.

SUMMARY OF THE INVENTION

Therefore, it is an object of the present invention to provide a gravity control apparatus utilizing uniform magnetic force, in which uniform magnetic force is generated by adopting a superconducting magnet design for generating spatially uniform magnetic force and correcting method for offset of magnetic force non-uniformity caused due to manufacturing errors of the magnet, and the gravity acting on substances can be controlled to be uniform through the use of thus-generated uniform magnetic force.

DETAILED DESCRIPTION OF THE PRESENT INVENTION

An apparatus for control of uniform gravity utilizing superconducting magnet will be explained in more detail with reference to the attached drawings.

To generate uniform magnetic field required for MR1 or NMR, a plurality of solenoid coils are arrayed in a optimized manner. In addition, a gradient magnetic field coils is employed so as to offset the non-uniform magnetic field component caused due to manufacturing errors including processing errors of coil bobbin and winding errors of coil. Utilization of optimized array of solenoid coil for uniform magnetic field makes it possible to design the superconducting magnet which generates spatially uniform magnetic field.

An apparatus for control of uniform gravity utilizing superconducting magnet comprises a hollow cylindrical low temperature container; a combination of $B_0$ coil and a symmetric and/or asymmetric gradient magnetic field generating coil having a predetermined length and inner and outer radiuses, wherein each of $B_0$ coil and gradient magnetic field generating coil is wound onto a bobbin which is installed to the low temperature container so as to form a superconducting magnet, and the $B_0$ coil has three solenoid coils which are arrayed in three parts with a predetermined spacing so as to generate, from the center of the $B_0$ coil, uniform magnetic field having constant magnetic flux density; and a power unit for supplying operating current to each of coils.

The present invention will be described by taking an example of adopting superconducting magnet design and manufacturing error correction, in which a uniform magnetic field coil and a gradient magnetic field coil are combined so as to generate uniform magnetic force. The present invention will also be described by taking an example of generating uniform magnetic force through the optimized combination of symmetric coil and asymmetric coil.

Figure 1:
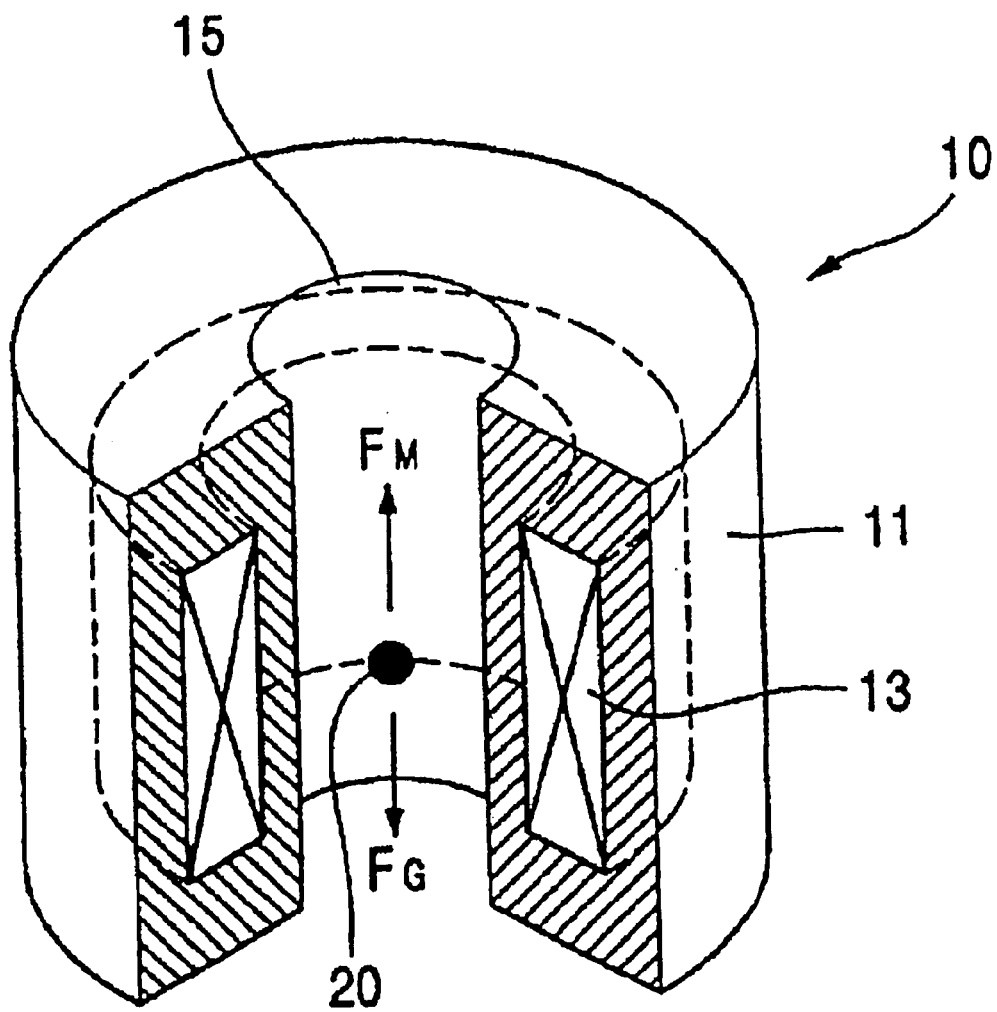
FIG. 1 is a schematic perspective view illustrating a conventional gravity control apparatus utilizing a superconducting magnet.
Figure 2:
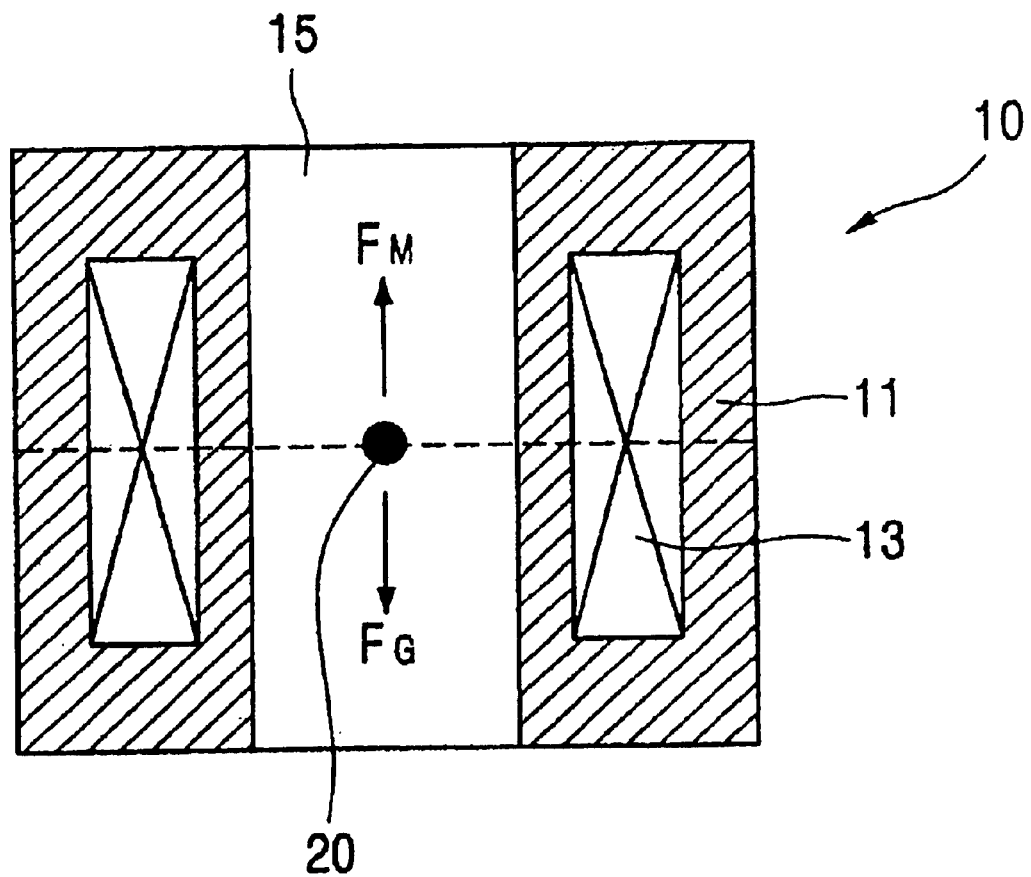
FIG. 2 is a sectional view of the conventional gravity control apparatus shown in FIG. 1.
Figure 3:
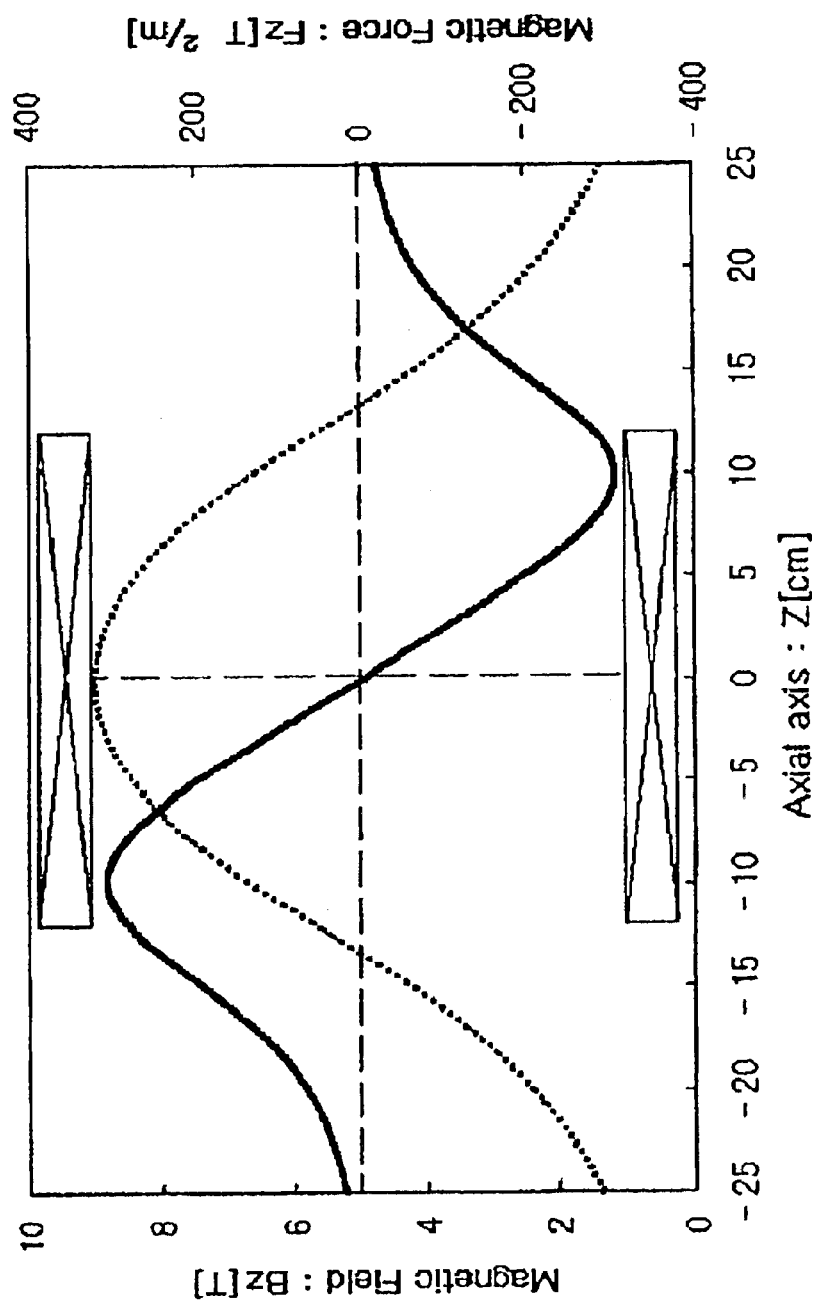
FIG. 3 is a graphical representation illustrating distribution of magnetic field and magnetic force of a solenoid coil of the conventional gravity control apparatus shown in FIG. 1.
Figure 4:
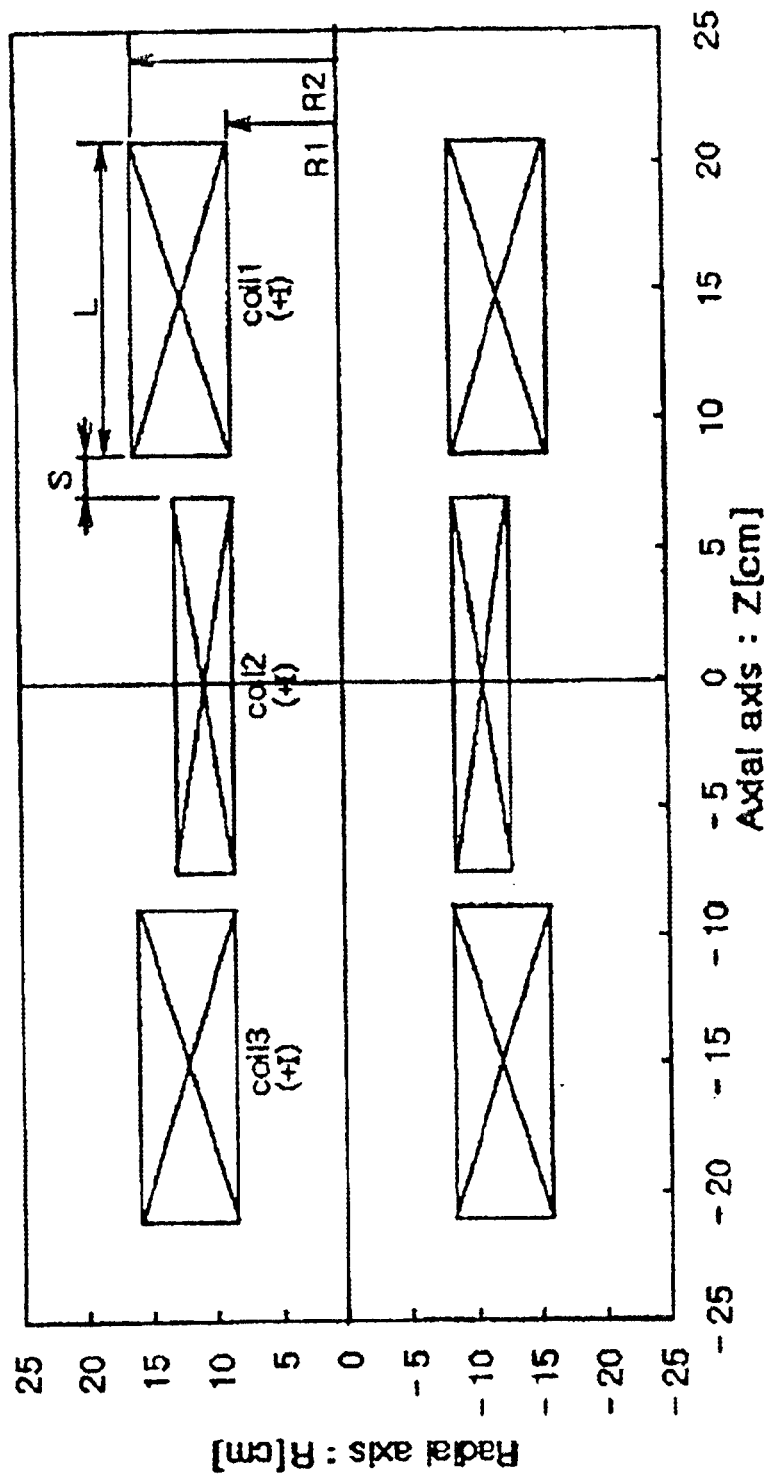
FIG. 4 illustrates an example of $B_0$ coil generating uniform magnetic field, wherein $B_0$ coil is constituted by a three-component solenoid coil having the hollow center of the low temperature container as a virtual x-axis.

FIG. 4 is a sectional view illustrating $B_0$ coil connected by three-component solenoid coil of uniform gravity control apparatus of the present invention. The $B_0$ coil of the present invention has first to third solenoid coils (coil1, coil2, coil3) having a predetermined length (L) and which are arranged in three parts with a predetermined spacing (S). The first solenoid coil (coil1) and the third solenoid coil (coil3) are wound with the second solenoid coil (coil2) interposed therebetween and predetermined inner radius (R1) and outer radius (R2), allowing magnetic field with uniform magnetic flux density to be generated from the center of the coil array.

Figure 6:
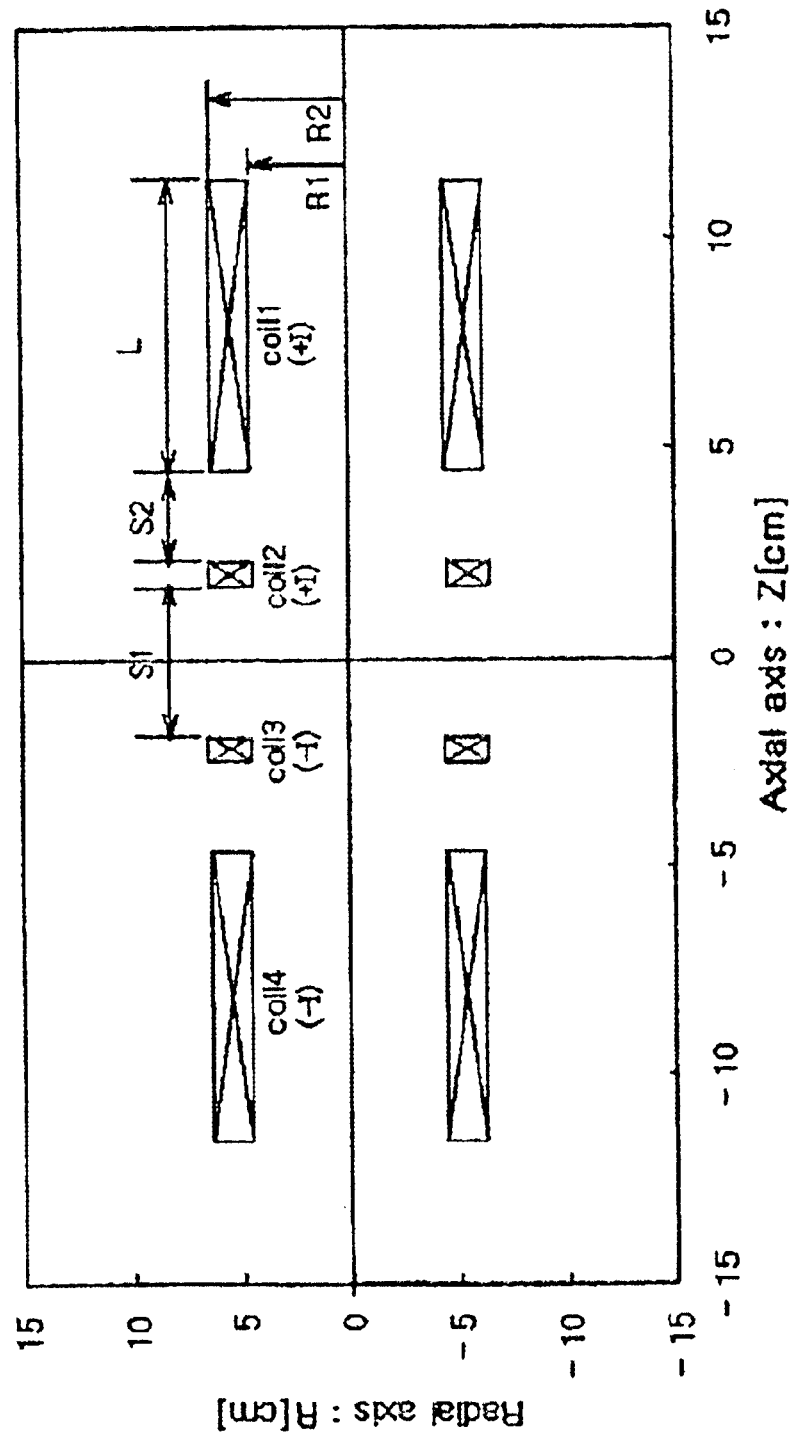
FIG. 6 is a schematic sectional view illustrating an example of Z1 coil generating a first gradient magnetic field, wherein shape of the Z1 coil and polarity of the current are illustrated using the hollow center of the low temperature container as a virtual z-axis.

FIG. 6 is a schematic view illustrating shape of Z1 coil and polarity of current employed for the gravity control apparatus of the present invention. The Z1 coil is configured in such a manner that gradient magnetic field of $q_1 z^1$ and magnetic force of $Z_1^2 z^1$ are generated by the first solenoid coil (coil1) having a predetermined length (L) and inner radius (R1) and outer radius (R2), the second solenoid coil (coil2) wound with a predetermined spacing (S2) from the first solenoid coil, and third and fourth solenoid coils (coil3, coil4) which are arranged in a symmetrical manner with a predetermined spacing (S1) from first and second solenoid coils (coil1, coil2).

Figure 7:
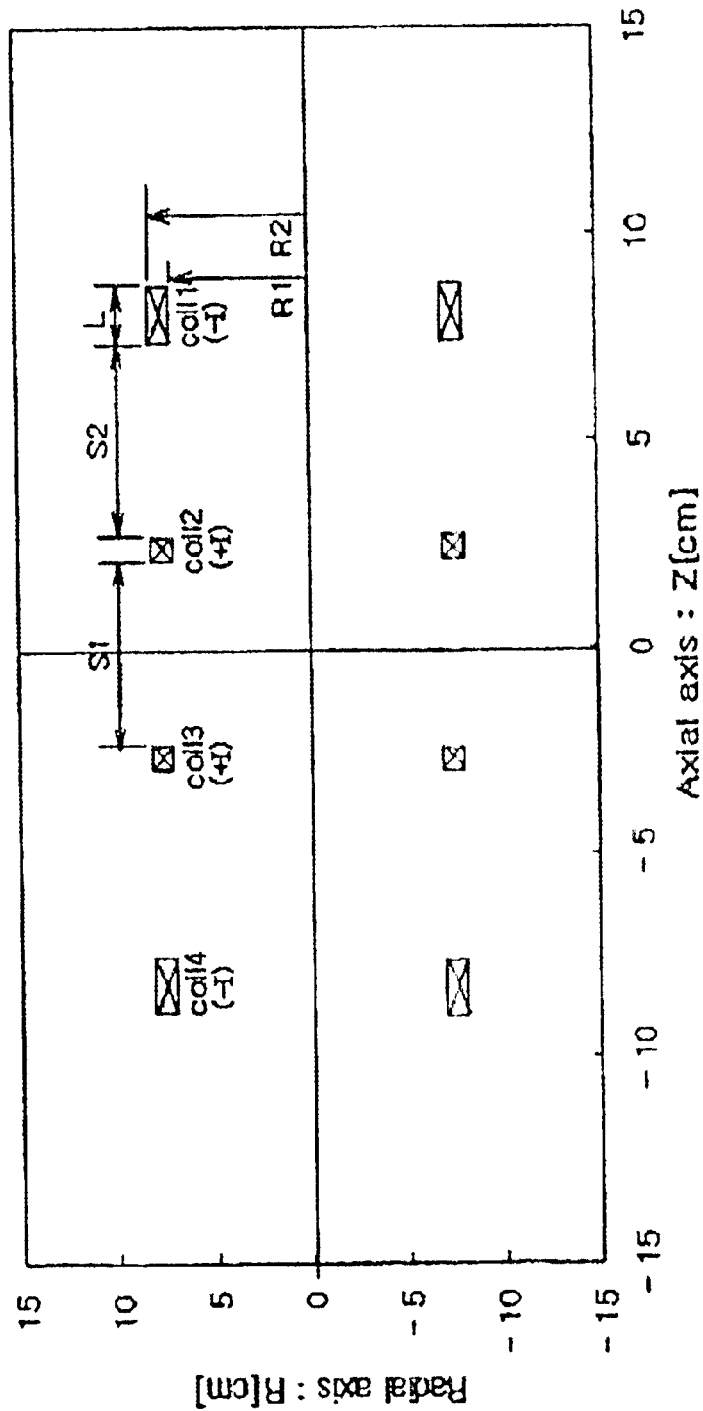
FIG. 7 is a schematic sectional view illustrating an example of Z2 coil generating a second gradient magnetic field, wherein shape of the Z2 coil and polarity of the current are illustrated using the hollow center of the low temperature container as a virtual z-axis.

FIG. 7 is a schematic view illustrating shape of Z2 coil and polarity of current employed for the gravity control apparatus of the present invention. The Z2 coil is configured in such a manner that gradient magnetic field of $z_2z^2$ and magnetic force of $2q_2^2z^3$ are generated by the first solenoid coil (coil1) having a predetermined length (L) and inner radius (R) and outer radius (R2), the second solenoid coil (coil2) wound with a predetermined spacing (S2) from the first solenoid coil, and third and fourth solenoid coils (coil3, coil4) which are arranged in a symmetrical manner with a predetermined spacing (S1) from first and second solenoid coils (coil1, coil2).

Figure 8:
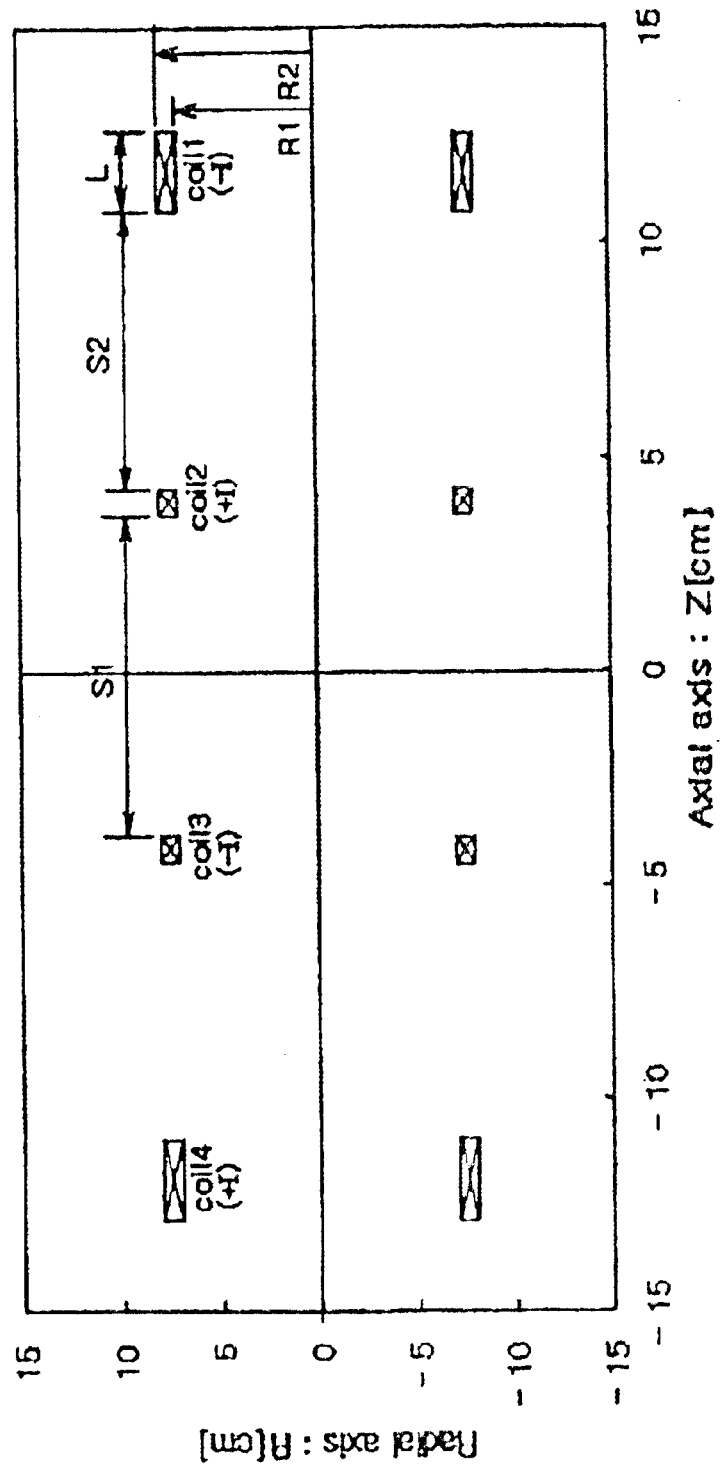
FIG. 8 is a schematic sectional view illustrating an example of Z3 coil generating a third gradient magnetic field, wherein shape of the Z3 coil and polarity of the current are illustrated using the hollow center of the low temperature container as a virtual z-axis.

FIG. 8 is a schematic view illustrating shape of Z3 coil and polarity of current employed for the gravity control apparatus of the present invention. The Z3 coil is configured in such a manner that gradient magnetic field of $z_3z^3$ and magnetic force of $3q_3^2z^5$ are generated by the first solenoid coil (coil1) having a predetermined length (L) and inner radius (R1) and outer radius (R2), the second solenoid coil (coil2) wound with a predetermined spacing (S2) from the first solenoid coil, and third and fourth solenoid coils (coil3, coil4) which are arranged in a symmetrical manner with a predetermined spacing (S1) from first and second solenoid coils (coil1, coil2).

Thus-configured uniform gravity control apparatus of the present invention operates as follows.

First, design of uniform magnetic force coil will be explained. In an axial symmetric system like a solenoid coil, magnetic flux density only has a radial component (Br) and an axial component (Bz). Therefore, radial component (Fr) and axial component (Fz) of the magnetic force can be developed from Formula (2) and expressed as follows.

[Formula 4]

$$Fr = \frac{\chi}{\mu^2}\left(Br\frac{\partial Br}{\partial r} + Bz\frac{\partial Bz}{\partial r}\right) \quad (4)$$

[Formula 5]

$$Fz = \frac{\chi}{\mu^2}\left(Br\frac{\partial Br}{\partial z} + Bz\frac{\partial Bz}{\partial z}\right) \quad (5)$$

wherein, $$\frac{\chi}{\mu^2}$$

is determined by the characteristic of the material to which magnetic force is applied, and the magnetic force generated from the magnet is determined by [the magnetic field× magnetic field gradient] [$T^2/m$]. That is, [magnetic field× magnetic field gradient] is a scale for indicating the size of the magnetic force. Hereinafter, said term $$\frac{\chi}{\mu^2}$$

is assumed 1 for simple derivation. Here, the magnetic force only at the z-axis of solenoid coil is taken into consideration, similarly to the case of design of uniform magnetic field coil. At z-axis, only the axial magnetic force component (Fz) exists since the magnetic force component (Fr) in radial direction is zero. The magnetic flux density (Br) in radial direction at z-axis is zero, the above-described Formula (5) can be simplified as follows.

[Formula 6]

$$Fz = Bz\frac{\partial Bz}{\partial z} \quad (6)$$

The magnetic flux density (Bz) at z-axis in the central space of solenoid coil is a function of axial distance z of the following Formula (7), which can be expressed in Taylor Series.

[Formula 7]

$$Bz = B_0 + \sum_{n=1}^{\infty} q_n z^n \quad (7)$$

wherein, $B_0$ is a central magnetic flux density, $$q_n = \frac{1}{n!}\frac{\partial^n Bz(0)}{\partial z^n}$$

is n-order source term of coil and determined by the geometric shape and current density of the coil. The Formula (7), when it is developed up to the fifth order term, can be expressed as the following Formula (8).

[Formula 8]

$$Bz = B_0 + q_1 z^1 + q_2 z^2 + q_3 z^3 + z_4 z^4 + q_5 z^5 \quad (8)$$

The following Formula (9) can be obtained, when the Formula (6) is substituted with Formula (8).

[Formula 9]

$$Fz = B_0 q_1$$
$$+(2B_0 z_2 + q_1^2)z^1$$
$$+(3B_0 q_3 + 3q_1 q_2)z^2$$
$$+(4B_0 q_4 + 4q_1 q_3 + 2q_2^2)z^3$$
$$+(5B_0 q_5 + 5q_1 q_4 + 5q_2 q_3)z^4$$
$$+(6B_0 q_6 + 6q_1 q_5 + 6q_2 q_4 + 3q_3^2)z^5 \quad (9)$$

In the Formula (8), $B_0$ is a magnetic field component which is constant regardless of position z. The other terms are n-order function of position z, which differ according to the position and have absolute value the size of which decreases as it goes toward high-order term. Therefore, magnet for use of MRI is designed in such a manner that order terms excluding $B_0$ term are minimized so as to produce a magnetic field which is spatially uniform. Similarly, $B_0 q_1$ of Formula (9) is a magnetic force component which is constant regardless of position z. The same is applied to the design of uniform magnetic force magnet in that other terms excluding $B_0 q_1$ term of Formula (9) are minimized so as to form a uniform magnetic force space.

As can be seen from Formula (9), the combination of the uniform magnetic field coil (hereinafter, referred to as $B_0$ coil) which generates $B_0$ component only and the first gradient magnetic coil (hereinafter, referred to as Z1 coil) which generates a first magnetic force component ($q_1$) only is necessitated so as to allow the central space of coil system to generate a predetermined magnetic force component $B_0 q_1$. The present invention proposes an approach where $B_0$ coil is employed as a background coil, and the first gradient magnetic field coil (Z1 coil), second gradient magnetic field coil (Z2 coil) and the third gradient magnetic field coil (Z3 coil) are combined with $B_0$ coil so as to generate uniform magnetic force from the central space of the coil.

The following Table 1 shows magnetic field (Bz) and magnetic force (Fz) of each coil in the central space thereof.

TABLE 1 magnetic field and magnetic force of each coil

| Coils | Bz | Fz |
|---|---|---|
| $B_0$ coil | $B_0$ | 0 |
| Z1 coil | $q_1 z^1$ | $q_1^2 z^1$ |
| Z2 coil | $q_2 z^2$ | $2 q_2^2 z^3$ |
| Z3 coil | $q_3 z^3$ | $3 q_3^2 z^5$ |
| $B_0$coil + Z1coil | $B_0 + q_1 z^1$ | $B_0 q_1 + q_1^2 z^1$ |
| $B_0$coil + Z2coil | $B_0 + q_2 z^2$ | $2 B_0 q_2 z^1 + 2 q_2^2 z^3$ |
| $B_0$coil + Z3coil | $B_0 + q_3 z^3$ | $3 B_0 q_3 z^2 + 3 q_3^2 z^3$ |

Figure 5:
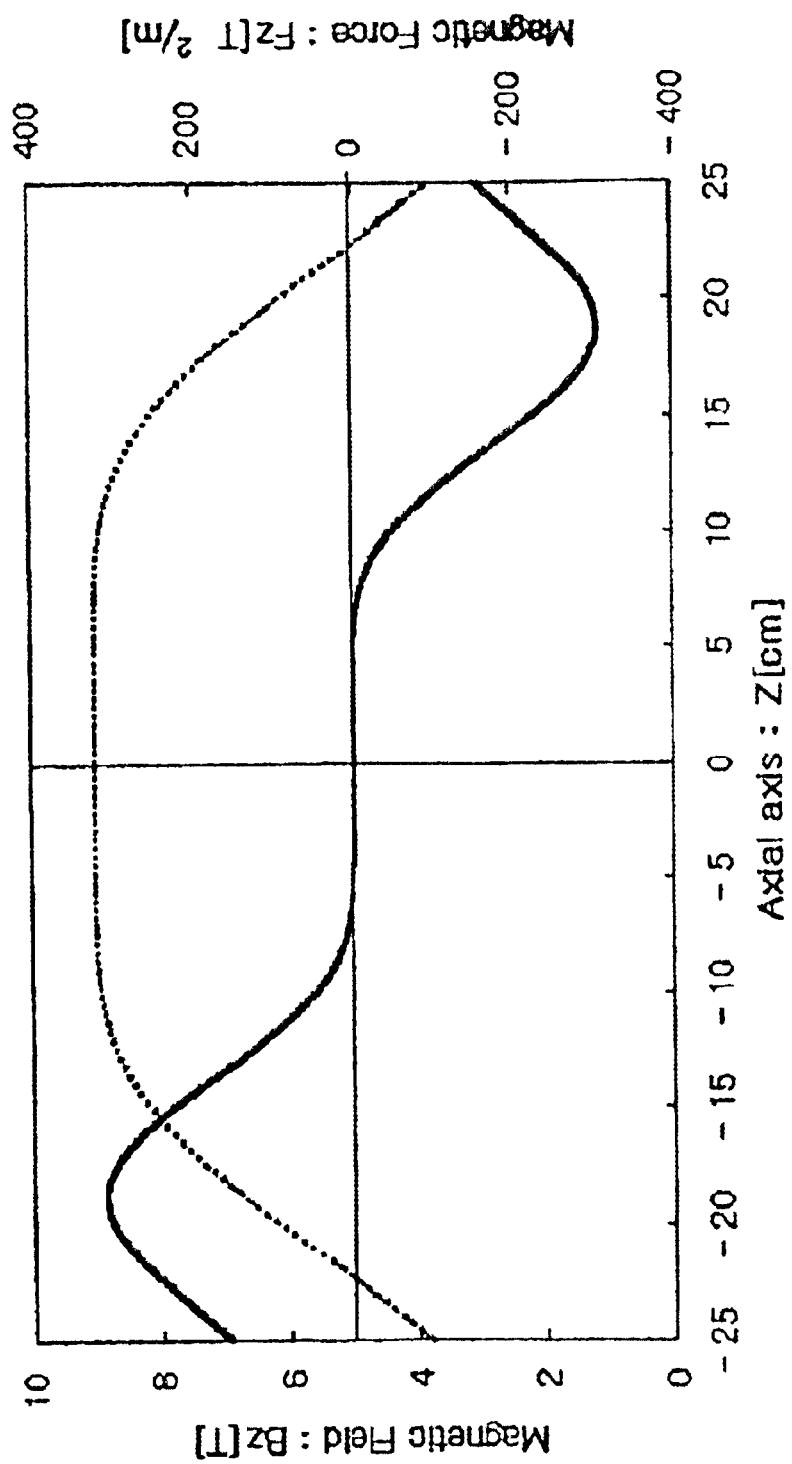
FIG. 5 is a graphical representation illustrating distribution of magnetic field and magnetic force of $B_0$ coil shown in FIG. 4.

FIG. 4 is a sectional view of $B_0$ coil which is constituted by three-component solenoid coil, and FIG. 5 is graphical representation illustrating distribution of the magnetic field and magnetic force of $B_0$ coil shown in FIG. 4, wherein $B_0$ coil has magnetic field (marked as a dotted line) which is distributed uniformly in the central space of the coil, and the magnetic force (marked as a solid line) which is zero since the gradient of the magnetic field is zero. On the contrary, both ends of the coil where gradient of magnetic field exists have magnetic force. FIGS. 6, 7 and 8 illustrate polarity of current and shape of coils Z1, Z2 and Z3 to be combined with $B_0$ coil. In the actual gradient magnetic field coil, polarity of the current illustrated in each of drawings denotes winding direction of coil since power is applied.

Figure 9:
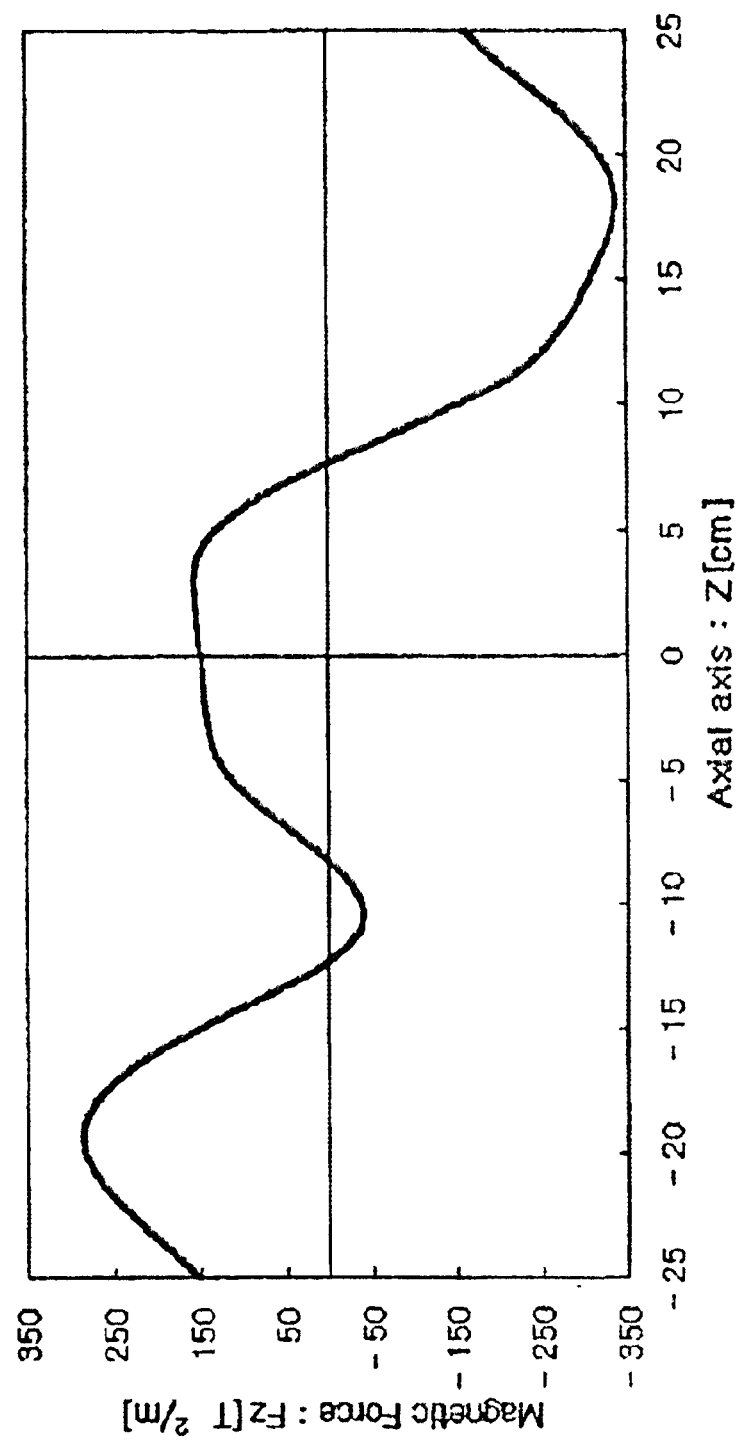
FIG. 9 is a graphical representation illustrating distribution of the magnetic force of the gravity control apparatus where $B_0$ coil is combined with Z1 coil.

FIG. 9 is a graphical representation illustrating distribution of magnetic force in case where $B_0$ coil shown in FIG. 4 is combined with Z1 coil shown in FIG. 6, wherein the uniform magnetic force component of $B_0 q_1$ and a slight amount of first order magnetic force component $q_1^2 z^1$ are generated from the central space of the coil. The size of the uniform magnetic force is determined by the size of central magnetic field $B_0$ [T] and magnetic field gradient $q_1$ [T/m] of Z1 coil.

Figure 10:
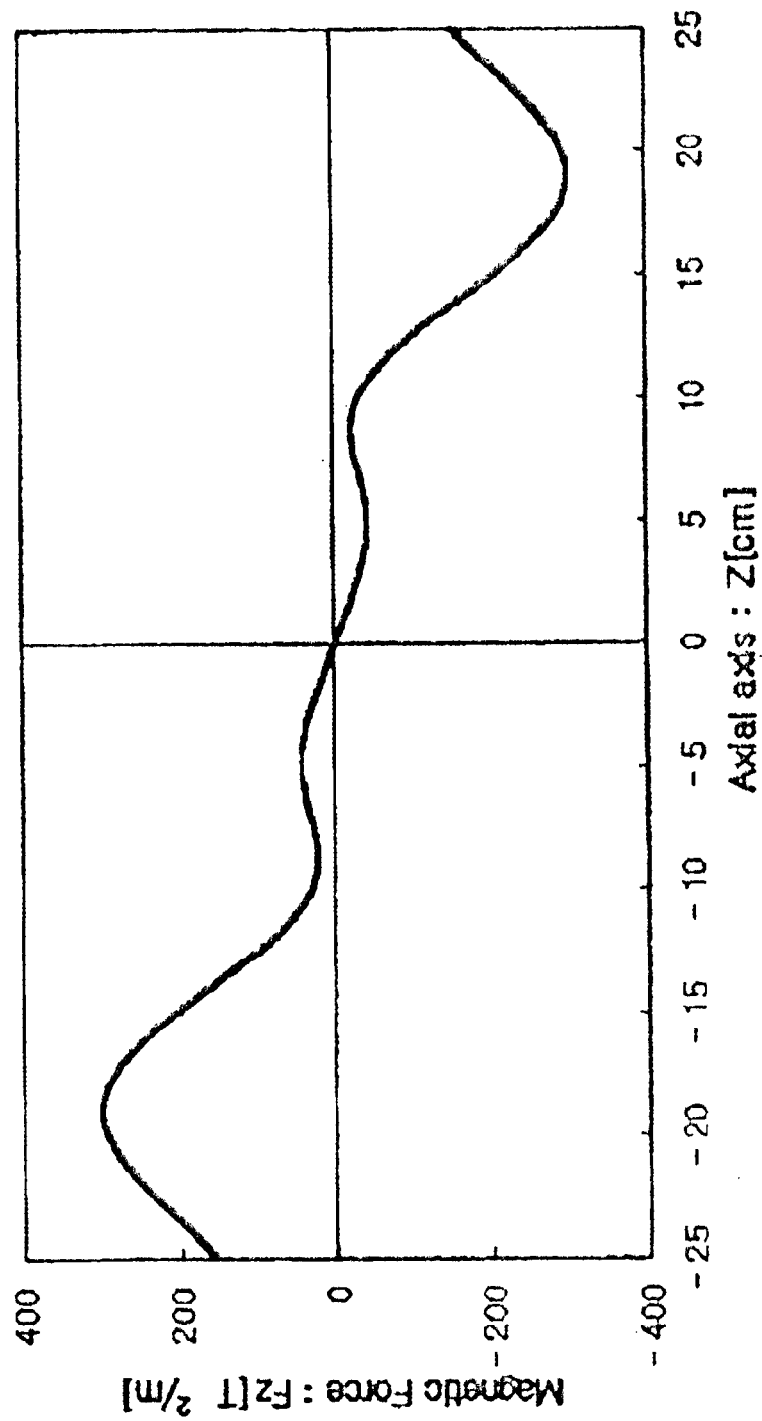
FIG. 10 is a graphical representation illustrating distribution of the magnetic force of the gravity control apparatus where $B_0$ coil is combined with Z2 coil.

FIG. 10 is a graphical representation illustrating distribution of magnetic force in case where $B_0$ coil shown in FIG. 4 is combined with Z2 coil shown in FIG. 7, wherein the first order magnetic force component of $2 B_0 q_2 z^1$ and the third order magnetic force component $2 q_2^2 z^3$ are generated from the central space of the coil. Since the third order magnetic force component at the central space of the coil is negligibly smaller than the first order magnetic force component, FIG. 10 illustrates distribution of the first order magnetic force at the central space. Therefore, combination of $B_0$ coil with Z2 coil can be used as a first correction coil for compensating for the first order magnetic force component.

Figure 11:
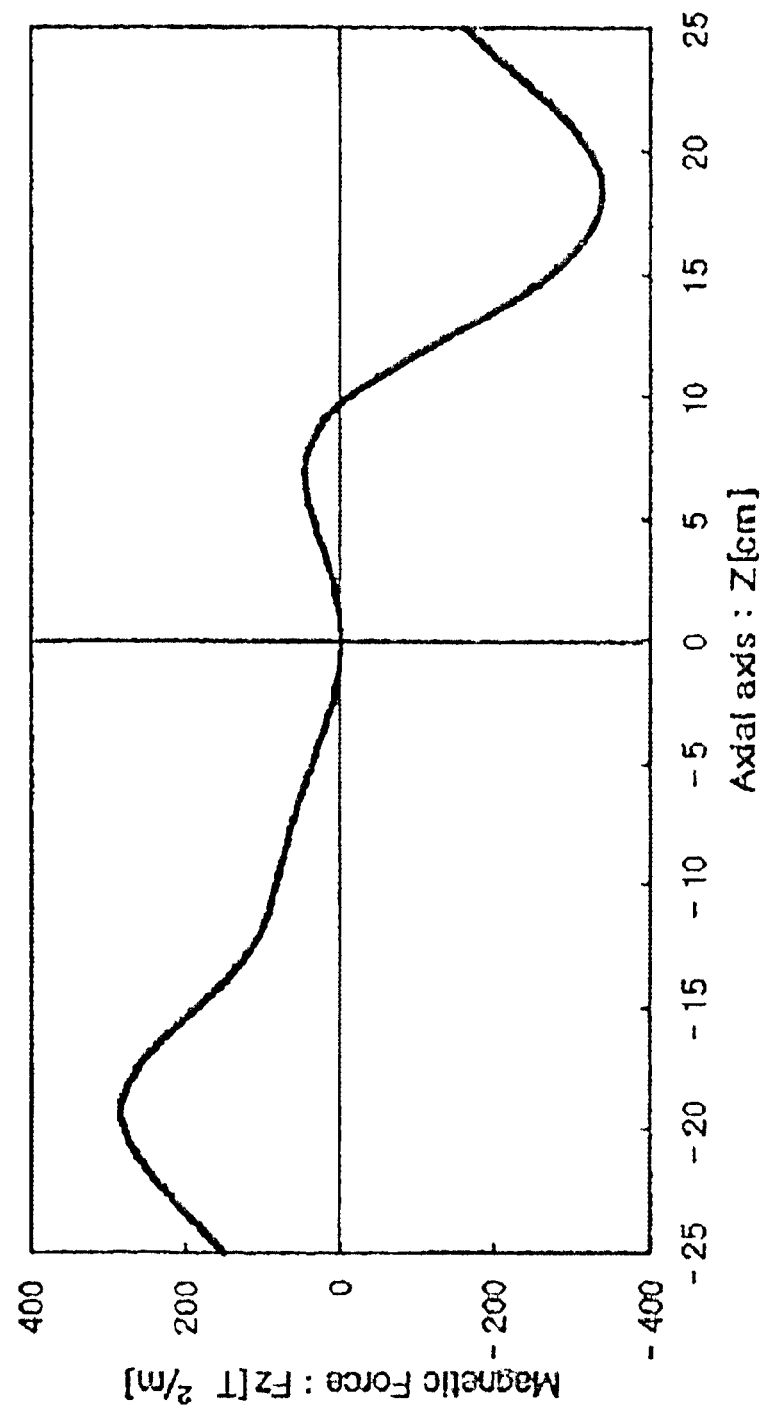
FIG. 11 is a graphical representation illustrating distribution of the magnetic force of the gravity control apparatus where $B_0$ coil is combined with Z3 coil.

FIG. 11 illustrates distribution of magnetic force in case where $B_0$ coil shown in FIG. 4 is combined with Z3 coil shown in FIG. 8, wherein the second order magnetic force component of $3 B_0 q_3 z^2$ and the fifth order magnetic force component $3 q_3^2 z^5$ are generated from the central space of the coil. Since the fifth order magnetic force component at the central space of the coil is negligibly smaller than the second order magnetic force component, FIG. 11 illustrates distribution of the second order magnetic force at the central space. Therefore, combination of $B_0$ coil with Z3 coil can be used as a second correction coil for compensating for the second order magnetic force component.

Figure 12:
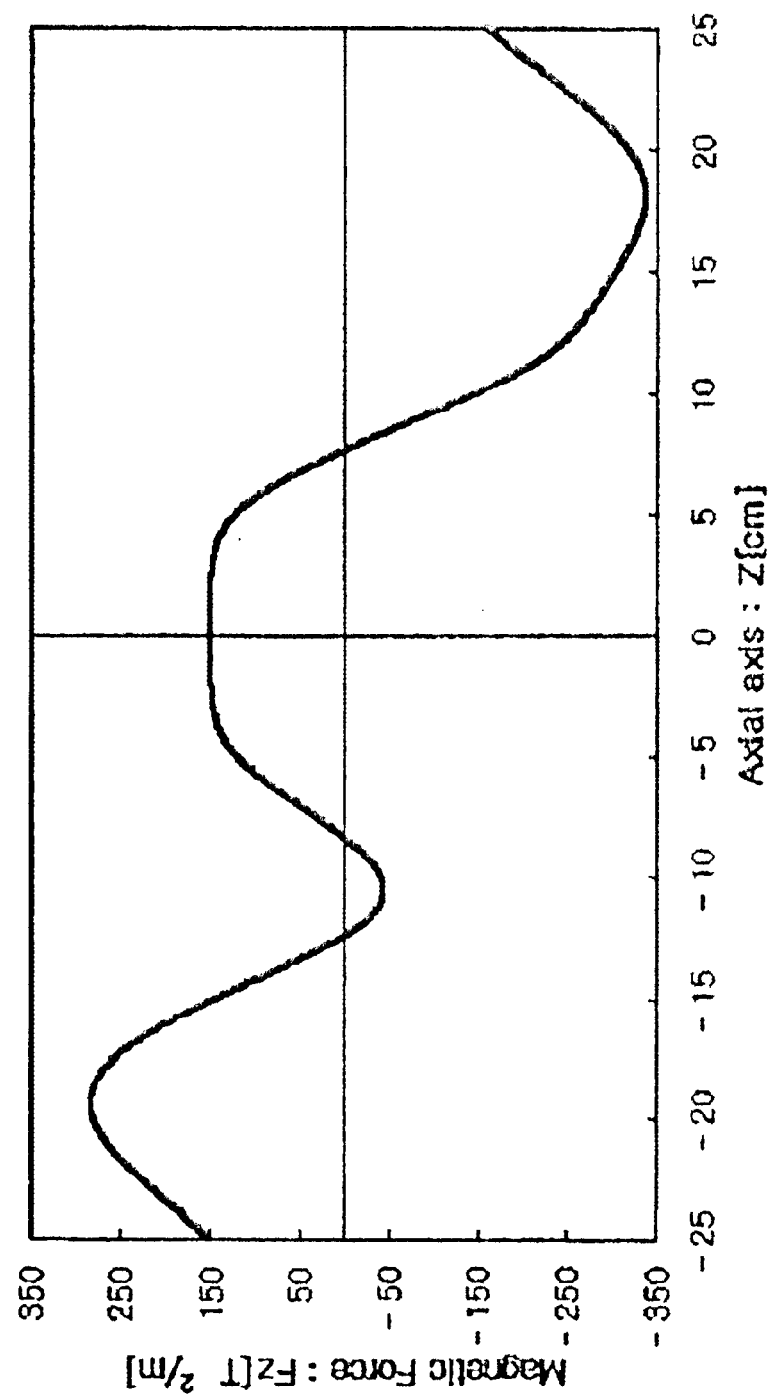
FIG. 12 is a graphical representation illustrating distribution of the magnet force of the gravity control apparatus where $B_0$ coil is combined with Z1, Z2 and Z3 coil.

FIG. 12 illustrates distribution of magnetic force in case where $B_0$ coil is combined with Z1, Z2 and Z3 coils, wherein uniform magnetic distribution is formed at the central space of the coil. Here, the combination of $B_0$ coil and Z1 coil is employed first so as to generate a magnetic force at the central space, and Z2 and Z3 coils are added thereto so as to compensate for first and second order magnetic force components.

Now, the present invention will be explained in detail by taking embodiments thereof with specified numerical value. In the first embodiment, combination of $B_0$ coil and Z1 coil is employed so as to generate magnetic force at the central space of coil, and Z2 and Z3 coils are added so as to compensate for first and second order magnetic force components. In the second embodiment, an optimized combination of symmetric coil and asymmetric coil is employed so as to generate uniform magnetic force.

Embodiment 1

Embodiment 1 of the present invention relates to a design of uniform magnetic force generating coil of 150 [$T^2$/m] by using NbTi superconducting rod wire and a method of varying magnetic force by varying operating current of gradient magnetic field coil. The following Table 2 shows specifications of $B_0$ coil having inner diameter of 17 cm, central magnet field of 9 [T], and magnetic field uniformity of 0.6 ppm at the sphere with diameter of 5 cm. The magnetic field and magnetic force generated from $B_0$ coil are shown in FIG. 5.

TABLE 2

$B_0$ coil specification

| Coils | Inner radius R1[cm] | Outer radius R2[cm] | Length L[cm] |
|---|---|---|---|
| Coil1 | 8.5 | 16.274 | 12.418 |
| Coil2 | 8.5 | 13.263 | 14.069 |
| Coil3 | 8.5 | 16.274 | 12.418 |

Distance between coils S[cm]:0.958
rod wire:NbTi, Φ 0.44 mm
winding density:480 Turns/$cm^2$
central magnetic flux density $B_0$:9[T] at I = 30 [A]
magnetic field uniformity, $(B - B_0)/B_0$:0.6 ppm/5 cm dsv The following Table 3 shows specification of Z1 coil for generating first order gradient magnetic field.

TABLE 3

Z1 coil specification

| Coils | Inner radius R1[cm] | Outer radius R2[cm] | Length L[cm] |
|---|---|---|---|
| Coil1 | 4.5 | 6.734 | 6.84 |
| Coil2 | 4.5 | 6.734 | 0.496 |
| Coil3 | 4.5 | 6.734 | 0.496 |
| Coil4 | 4.5 | 6.734 | 6.84 |

Distance between coils:S1 = 3.73[cm], S2 = 2.101[cm]
rod wire:NbTi, Φ 0.44 mm
winding density:480 Turns/$cm^2$
first order magnetic field gradient per unit current $q_1$:1.108[$T \cdot m^{-1} \cdot A^{-1}$]

The following Table 4 shows specification of Z2 coil for generating second order gradient magnetic field.

TABLE 4

Z2 coil specification

| Coils | Inner radius R1[cm] | Outer radius R2[cm] | Length L[cm] |
|---|---|---|---|
| Coil1 | 7.0 | 8.14 | 1.368 |
| Coil2 | 7.0 | 8.14 | 0.522 |
| Coil3 | 7.0 | 8.14 | 0.522 |
| Coil4 | 7.0 | 8.14 | 1.368 |

Distance between coils: S1 = 4.396[cm], S2 = 4.545[cm]
rod wire:NbTi, Φ 0.44 mm
winding density:480 Turns/cm$^2$
second order magnetic field gradient per unit current $q_2$:−1.3238[T · m$^{-2}$ · A$^{-1}$]

The following Table 5 shows specification of Z3 coil for generating third order gradient magnetic field.

TABLE 5

Z3 coil specification

| Coils | Inner radius R1[cm] | Outer radius R2[cm] | Length L[cm] |
|---|---|---|---|
| Coil1 | 7.0 | 8.14 | 1.888 |
| Coil2 | 7.0 | 8.14 | 0.489 |
| Coil3 | 7.0 | 8.14 | 0.489 |
| Coil4 | 7.0 | 8.14 | 1.888 |

Distance between coils:S1 = 7.446[cm], S2 = 6.5[cm]
rod wire:NbTi, Φ 0.44 mm
winding density:480 Turns/cm$^2$
third order magnetic field gradient per unit current $q_3$:−12.71[T · m$^{-3}$ · A$^{-1}$]

The following Table 6 shows operating current of each coil required for generating uniform magnetic force of 150 [T$^2$/m] at the central space of coil combination.

TABLE 6 operating coil for each coil required for generating uniform magnetic force of 150 [T$^2$/m]

| Coils | operating current[A] | Operating current calculation basis |
|---|---|---|
| B$_0$ coil | I$_{B_0}$ = +30 | Generate uniform background magnetic field of 9[T] |
| Z1 coil | I$_{z1}$ = +15.04 | Calculate from B$_0$(q$_1$ × I$_{z1}$) = 150[T$^2$/m] |
| Z2 coil | I$_{z2}$ = +11.654 | Magnetic force component of 2B$_0$q$_2$z$^1$ with same size and opposite polarity is required to be generated so as to compensate for the first order magnetic force component q$_1^2$z$^1$ which is generated by the addition of Z1coil, therefore $$I_{z2} = -\frac{(q_1 \times I_{z1})^2}{2B_0 q_2}$$ |
| Z3 coil | I$_{z3}$ = −2.25 | Magnetic force component of 3B$_0$q$_3$z$^2$ with same size and opposite polarity is required to be generated so as to compensate for the second order magnetic force component 3q$_1$q$_2$z$^2$ which is generated by the addition of Z1 and Z2 coils, therefore $$I_{z3} = -\frac{3(q_1 \times I_{z1})(q_2 \times I_{z2})}{3B_0 q_3}$$ |

The following Table 7 shows distribution of magnetic force when the operating current of each coil calculated in Table 6 is applied. The uniformity of the magnetic force is 39 ppm in the cylinder with a diameter of 1 cm and a length of 1 cm.

TABLE 7 magnetic force distribution and uniformity in the cylinder of diameter 1[cm] and length 1[cm]

| z[cm] | r[cm] | Fz[T$^2$/m] | Fr[T$^2$/m] | F = $\sqrt{Fz^2+Fr^2}$ [T$^2$/m] | (F(z, r) − F(0,0))/ F(0,0) |
|---|---|---|---|---|---|
| 0 | 0 | 149.96155 | 0 | 149.96155 | 0 |
| 0.25 | 0 | 149.96238 | 0 | 149.96238 | 0.55 × 10$^{-5}$ |
| 0.5 | 0 | 149.96328 | 0 | 149.96328 | 1.1 × 10$^{-5}$ |
| 0 | 0.25 | 149.95919 | 0.52024 | 149.96009 | 0.98 × 10$^{-5}$ |
| 0.25 | 0.25 | 149.95999 | 0.51550 | 149.96088 | 0.45 × 10$^{-5}$ |
| 0.5 | 0.25 | 149.96081 | 0.51068 | 149.96168 | 0.08 × 10$^{-5}$ |
| 0 | 0.5 | 149.95210 | 1.04042 | 149.95571 | 3.9 × 10$^{-5}$ |
| 0.25 | 0.5 | 149.95291 | 1.03101 | 149.95645 | 3.4 × 10$^{-5}$ |
| 0.5 | 0.5 | 149.95349 | 1.02154 | 149.95697 | 3.1 × 10$^{-5}$ |

The following Table 8 shows the method of varying magnetic force by changing operating current of ingredient magnetic force coil at the state where the operating coil of B$_0$ coil is maintained constant.

TABLE 8 method for varying magnetic force

| N | I$_{B0}$ [A] | I$_{z1}$ = n · I$_{z10}$ [A] | I$_{z2}$ = n$^2$ · I$_{z20}$ [A] | I$_{z3}$ = n$^3$ · I$_{z30}$ [A] | Fz = n · Fz$_0$ [T$^2$/m] |
|---|---|---|---|---|---|
| 1 | +30 | +15.04 | +11.654 | −2.25 | +150 |
| −1 | +30 | −15.04 | +11.654 | +2.25 | −150 |
| 0.5 | +30 | +7.52 | +2.914 | −0.281 | +75 |
| 1.5 | +30 | +22.56 | +26.222 | −7.594 | +225 |

Figure 13:
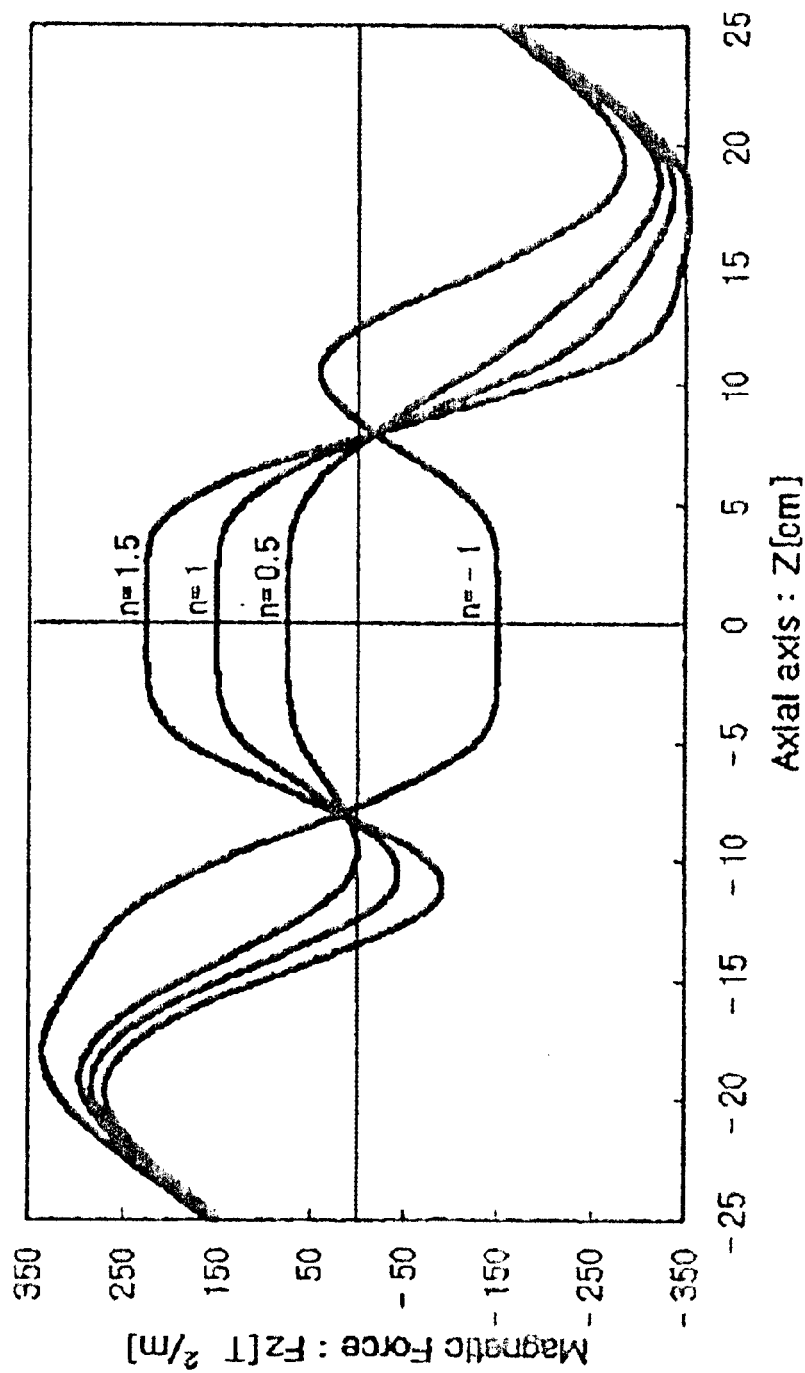
FIG. 13 is a graphical representation illustrating distribution of the magnet force when the size of current and polarity of each coil are adjusted in the gravity control apparatus where $B_0$ coil is combined with Z1, Z2 and Z3 coils.

If the operating current of each gradient magnetic field coil required for generating uniform magnetic force of 150 [T$^2$/m] has initial value of I$_{z10}$, I$_{z20}$ and I$_{z30}$, the relation of I$_{z1}$=n·I$_{z1\_0}$, I$_{z2}$=n$^2$·I$_{z20}$, and I$_{z3}$=n$^3$·I$_{z30}$ is satisfied from the calculation basis of operating current shown in Table 6, so as to vary the size of magnetic force by n-times, while maintaining magnetic force distribution at uniformity. If n=1, direction of magnetic force can be varied. Thus, direction of magnetic force can be suitably controlled in accordance with the polarity of magnetic susceptibility of objective material. FIG. 13 illustrates an example of varying the size and direction of magnetic force.

The above description is for Embodiment 1 of the uniform gravity control apparatus of the present invention, in which uniform magnetic field coil and first, second and third order gradient magnetic field coils designed independently are combined, and current value of each coil is adjusted, so as to thereby generate uniform magnetic force.

Embodiment 2

In Embodiment 2 of the present invention, combination of the coil which is arrayed to have current direction symmetric with respect to z=0 plane and the coil which is arrayed to have current direction asymmetric with respect to z=0 plane, is input as an initial shape of the coil, and uniform magnetic force is generated through the optimization of coil shape.

B$_0$ coil shown in FIG. 4 is the one which is arrayed to have current direction symmetric with respect to z=0 coil. Such a coil with symmetric array generates, from Formula (7), magnetic field components of even number order term like B$_0$, q$_2$, q$_4$ . . . only. On the contrary, the coil with current polarity which is asymmetric with respect to z=0 plane, like Z1 coil shown in FIG. 6, generates magnetic field components of odd number order term like q$_1$, q$_3$, q$_5$ . . . only. Therefore, combination of such symmetric coil and asymmetric coil generates all components of magnetic force shown in Formula (9) from the central space of coil combination. If other terms excluding $B_0q_1$ term are minimized through optimization of coil shape, uniform magnetic force space is formed.

Figure 14:
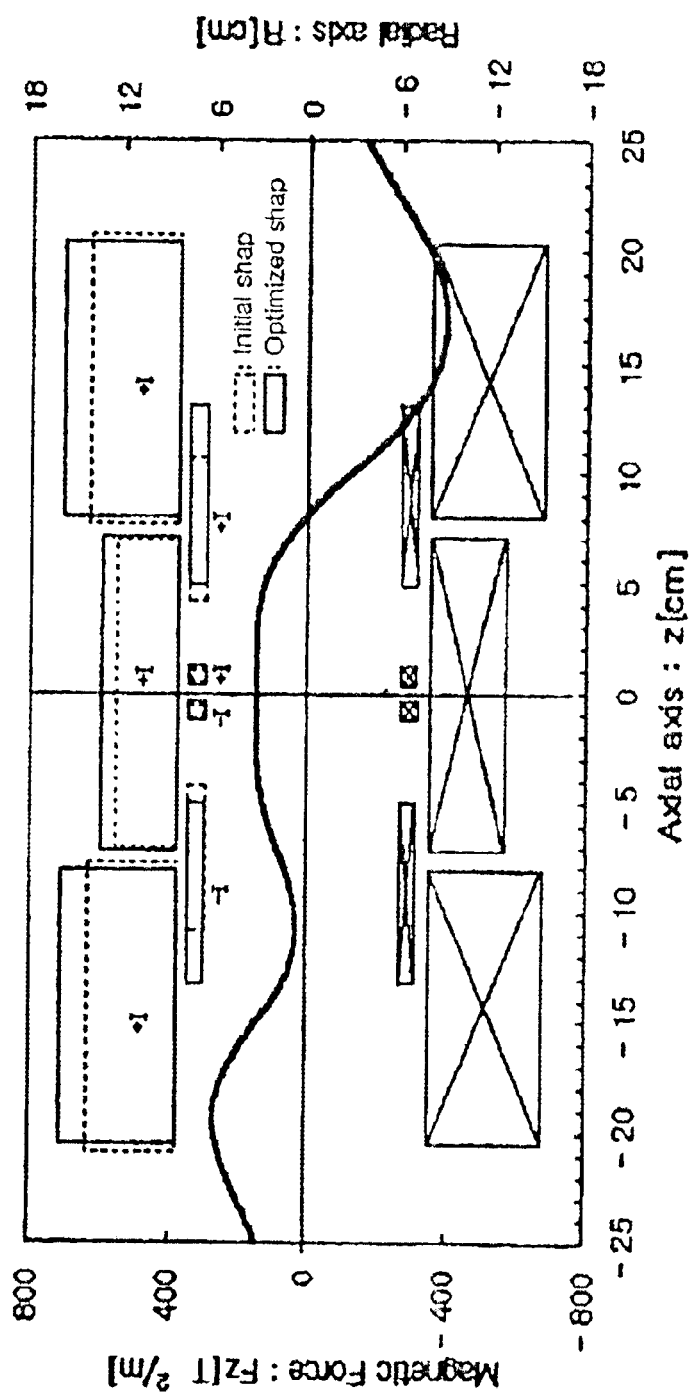
FIG. 14 is a graphical representation illustrating distribution of uniform magnetic force generated through the optimization of coil shape in the gravity control apparatus where $B_0$ coil is combined with Z1 coil.

FIG. 14 illustrates the coil which is designed to generate uniform magnetic force of 150 [$T^2$/m] through the non-linear optimization method, using thickness and length of each coil and distance between coils as a variable for design. Referring to FIG. 14, the dotted line denotes the initial shape of coil, and the solid line denotes the optimized shape of coil.

A non-linear least squares method expressed in the following Formula (10) is adopted so as to obtain the optimized coil shape.

[Formula 10]

$$\text{Minimize} \frac{1}{2} \sum_{i=1}^{m} [(f_0 - Df_0)^2 + (f_i - Mf_i)^2]$$

wherein, $f_0$ and $f_i$ respectively denote uniform magnetic force component $B_0q_1$ and other magnetic force components shown in Formula (9). $Df_0$ is the size of uniform magnetic force component to be generated, and m is the number of magnetic force components to be minimized. $Mf_1$ is the minimization margin of each magnetic force component. In the example shown in FIG. 14, coil shape optimization is obtained by setting $Df_0$=150, m=5, $Mf_1$=1×10$^{-5}$, and the uniformity of magnetic force is 37 ppm in the cylindrical space with diameter 1 [cm] and length 1 [cm].

As described above, the present invention provides a gravity control apparatus in which uniform magnetic force is generated by adopting a superconducting magnet design for generating spatially uniform magnetic force and correcting method for offset of magnetic force non-uniformity caused due to manufacturing errors of the magnet, and the gravity acting on substances can be controlled to be uniform through the use of thus-generated uniform magnetic force.

The gravity control apparatus of the present invention makes it possible to generate spatially uniform magnetic force. In the uniform magnetic force space provided by the gravity control apparatus of the present invention, it is possible to obtain defectless single crystal growth since uniform control of gravity is made possible. Further, new functional material can be made by the uniform control of material flow and chemical reaction through the use of the apparatus of the present invention. Specifically, size of magnetic force can be varied in a free manner when the method of Embodiment 1 of the present invention is adopted, and environment with a variable gravity can be arranged as a space for a single crystal growth and marking new functional material.

While preferred embodiments of the invention have been illustrated and described, it should be understood that the invention is not limited to the specifics of these embodiments, but rather is defined by the appended claims.

What is claimed is:

1. An apparatus for control of uniform gravity utilizing superconducting magnet, said apparatus comprising:

a hollow cylindrical low temperature container;

a combination of $B_0$ coil and a symmetric and/or asymmetric gradient magnetic field generating coil having a predetermined length and inner and outer radiuses, wherein each of $B_0$ coil and gradient magnetic field generating coil is wound onto a bobbin which is installed to said low temperature container so as to form a superconducting magnet, and said $B_0$ coil has three solenoid coils which are arrayed in three parts with a predetermined spacing so as to generate, from the center of said $B_0$ coil, uniform magnetic field having constant magnetic flux density; and a power unit for supplying operating current to each of coils.

2. An apparatus according to claim 1, wherein said gradient magnetic field generating coil is an asymmetric Z1 coil for generating gradient magnetic field of $q_1z^1$ and magnetic force of $q_1^2z^1$, symmetric Z2 coil for generating gradient magnetic field of $q_2z^2$ and magnetic force of $2q_2^2z^3$, and asymmetric Z3 coil for generating gradient magnetic field of $q_3z^3$ and magnetic force of $3q_3^2z^5$, through use of four coils, respectively.

3. An apparatus according to claim 2, wherein said operating current is applied to offset said first order magnetic force component $q_1^2z^1$ term and second order magnetic force component $3q_1q_2z^3$ term, excluding uniform magnetic force component $B_0q_1$ term from among magnetic force components generated upon combination of said $B_0$ coil and bobbins wound with Z1, Z2 and/or Z3 coils, respectively, said operating current being same in size and opposite in polarity.

4. An apparatus according to claim 2, wherein said operating current satisfies relation of $I_{z1} = n \cdot I_{z1\,0}$, $I_{z2} = n^2 \cdot I_{z20}$, and $I_{z3} = n^3 \cdot I_{z30}$, and size and direction of magnetic force are varied by changing value of n.

5. An apparatus according to claim 2, wherein said $B_0$ coil and Z2 coil are combined to form a first correction coil, and said $B_0$ coil and Z3 coil are combined to form a second correction coil, said first and second correction coils being employed for offset of non-uniform magnetic force component caused due to manufacturing errors of each coil.

6. A gravity control apparatus utilizing uniform magnetic force, wherein a hollow cylindrical bobbin is wound with symmetric coil and asymmetric coil and installed to a hollow cylindrical low temperature container so as to form a superconducting magnet, said superconducting magnet being applied with operating current so as to generate all magnetic force components from a central space of said superconducting magnetic, and a space with a uniform magnetic force is formed by a non-linear optimization method for minimizing all magnetic force terms excluding a uniform magnetic force component $B_0q_1$ term through optimization of coil shape.

* * * * *